United States Patent

[11] 3,628,924

[72] Inventors Yasuhiro Nishio
 Saeki-gun;
 Takashi Ohmae; Yasuyuki Yoshida, both of Hiroshima; Tamotsu Oka, Saeki-gun, all of Japan
[21] Appl. No. 17,189
[22] Filed Mar. 6, 1970
[45] Patented Dec. 21, 1971
[73] Assignee Mitsubishi Jukogyo Kabushiki Kaisha
 Tokyo, Japan
[32] Priorities Mar. 7, 1969
[33] Japan
[31] 44/16822;
 Mar. 10, 1969, Japan, No. 44/17534

[54] TA OR TA ALLOY CLAD STEELS
 3 Claims, 8 Drawing Figs.
[52] U.S. Cl. .................................................. 29/196,
  29/198, 29/183
[51] Int. Cl. ............................................. B32b 15/00
[50] Field of Search ................................. 29/196, 198

[56] References Cited
UNITED STATES PATENTS
| 1,979,539 | 11/1934 | Gadner | 29/198 |
| 2,387,903 | 10/1945 | Hensel | 29/198 |
| 2,993,269 | 7/1961 | Kelley | 29/198 |
| 3,307,925 | 3/1967 | Jacobson | 29/198 |

Primary Examiner—Hyland Bizot
Attorney—McGlew and Toren

ABSTRACT: Clad steel plate is formed of a base layer of carbon steel, an intermediate layer formed of one of the group consisting of Ti, Zr, Mo, Nb and their alloys deposited on the base layer, and a surface layer formed of one of Ta and Ta deposited on the surface of the intermediate layer. In welding sections of such clad steel plates together, the base layers are welded together using a welding rod of a common metal with the base layer, the edges of the intermediate and surface layers are spaced apart forming a groove extending across the weld in the base layers, a metal plate formed of a material compatible with the intermediate and surface layers is positioned in the groove, and a bridge member of the same material as the surface layer is fillet welded to the surface layers of both plate sections and covers the metal plate located within the groove.

PATENTED DEC 21 1971    3,628,924

INVENTORS
YASUHIRO NISHIO
TAKASHI OHMAE
YASUYUKI YOSHIDA
TAMOTSU OKA

BY McGlew & Toren
ATTORNEYS

TA OR TA ALLOY CLAD STEELS

The present invention relates to Ta or Ta alloy clad steels which are adapted for use where a sound weld is desired to be obtained in the welding of two different metals of the same group with each other.

As is well known, a clad steel is composed of a base sheet, consisting of carbon steel, and an alloy sheet bonded to the entire surface of said base sheet. However, where the base material of the alloy sheet is an active material, such as Ti or Zr, a brittle intermediate layer is formed between the base sheet and the alloy sheet in the welding of said sheets directly with each other and consequently the corrosion resistance and the mechanical properties of the resultant weld are degraded. For this reason, it has been commonly practiced, in the welding of the clad steel of the type described, to form a groove at the spot of welding as shown in FIG. 1.

Describing this more specifically with reference to FIG. 1, reference numeral 1 designates sheets of carbon steel, 2 a weld between the carbon steel sheets 1, 3 a Ti- or Zr-base alloy sheets, 4 a bridge member of Ti or Zr, 5 a filler and 6 fillet welds of the same metal as the bridge member 4. The welding procedure comprises the steps of partially removing the alloy sheets 3 to form a groove 5a prior to the welding of the carbon steel sheets 1, welding said carbon steel sheets 1 together using a welding rod of a metal of the same group as the carbon steel, whereby the weld 2 is formed, removing the bead of the weld 2 projecting into the groove 5a to make the bottom of said groove flat, filling the groove between the opposite alloy sheets with Ti or Zr material, and placing the bridge member 4 on top of the edges of the alloy sheets and welded thereto by fillet welding according to the TIG method.

In practicing the method described above, the filler for filling the groove 5a may be fixed in position by means of solder 7, as shown in FIG. 2, or the bridge member 4 may be depressed into the groove 5a and brought into close contact directly with the carbon steel sheets 1, as shown in FIG. 3, instead of fitting the filler into said groove.

However, when two of clad steel sheets comprising a Ta or Ta alloy sheet are welded together by the same method as used in the welding of the conventional clad steel sheet, the contacting surfaces of the Ta sheet 9 and the carbon steel sheet 1 are melted before the outer surface 10 of said Ta sheet is melted, and a brittle intermediate layer 11 is formed as shown in FIG. 4a, or the entire deposited metal 12 becomes brittle as shown in FIG. 4b. Therefore, when the Ta sheet 9 is melted by the heat of an arc 13, the iron in the carbon steel sheet migrates into the weld, with the result that the inherent corrosion-resistant property and mechanical properties of the weld are degraded and the weld becomes extremely brittle. This can presumably be attributed mainly to the facts that the melting point of Ta (about 2,996° C.) is extremely higher than that of steel (about 1,530° C.) and that the thermal conductivity of Ta is high (about four times that of Ti). Thus, the conventional clad steel sheet has the shortcoming that it is not suitable for use in such welding, in view of the degradation of the weld in its corrosion-resistant property and mechanical properties.

The present invention, therefore, has for its object the provision of Ta or Ta alloy clad steels which are free of the aforesaid drawback of the conventional carbon steel. The clad steels according to the present invention are characterized in that they are composed of a carbon steel base; an intermediate layer consisting of such a material as Ti, Zr, Mo, Nb or an alloy thereof which is low in thermal conductivity and high in melting point and will not become brittle upon being fused together with Ta, and attached to a portion of the surface or the entire surface of said carbon steel base; and a Ta or Ta alloy layer superposed on top of a portion of the surface or the entire surface of said intermediate layer. According to the present invention, it is possible to improve the corrosion-resistant property and mechanical properties of the weld.

The present invention will be more fully understood from the following detailed description when taken in conjunction with the accompanying drawings, in which:

FIG. 4 is a set of diagrams illustrating the objectionable conditions heretofore encountered in the welding of a TA clad steel, in which FIG. 4a is the condition occurring in the stage of heating and FIG. 4b is the condition occurring in the stage of welding;

Photograph 1 is a microscopic photograph showing the state of the clad steel of this invention upon welding;

Photograph 2 is a microscopic photograph showing the state of the boundary between the Ti layer and the carbon steel base at a portion immediately below the welded portion; and Photograph 3 is a photograph showing the result of a bending test conducted on the weld of the clad steel according to the invention.

The invention will be described in further detail with reference to the embodiments thereof shown in FIGS. 5 to 8.

Figure 5:
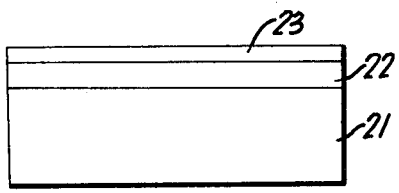
FIG. 5 is a diagram showing the structure of a clad steel according to the present invention.

Referring first to FIG. 5, reference numeral 21 designates a steel base and 22 designates an intermediate layer of such a material as Ti, Nb, Zr, Mo or an alloy thereof which has a melting point intermediary between the melting points of Ta and steel, and a low thermal conductivity, and will not become brittle when fused together with Ta. The intermediate layer 22 is attached to the entire surface of the steel base 21 or a portion thereof. Reference numeral 23 designates a Ta layer which is attached to the entire surface of the aforesaid intermediate layer 22 or a portion thereof.

Figure 6:
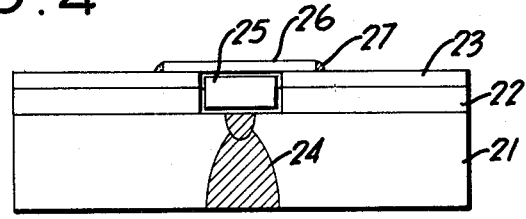
FIG. 6 is a diagram illustrating the welding of two sheets of the clad steel according to the invention.

The procedure of welding the clad steel shown in FIG. 5 will be described with reference to FIG. 6 hereunder: First of all, the carbon steel bases 21 of two sheets of the clad steel are welded together, using a welding rod of common metal, whereby a weld 24 is formed. Then, a metal plate 25 is fitted in a groove, formed by the two sheets of the clad steel, to fill the same, and thereafter a bridge member 26 of the same material as the Ta layer 23 is placed on top of and welded to the confronting edge portions of the Ta layers 23 by fillet welding, as indicated at 27.

Figure 1:
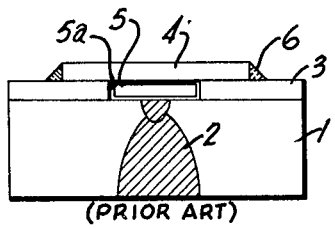
FIGS. 1, 2 and 3 are diagrams illustrating conventional methods of welding a Ti or Zr clad steel respectively.
Figure 2:
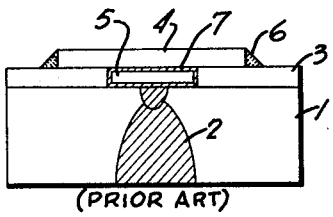
Figure 3:
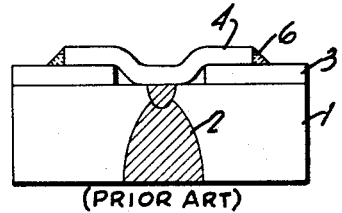
Figure 4:
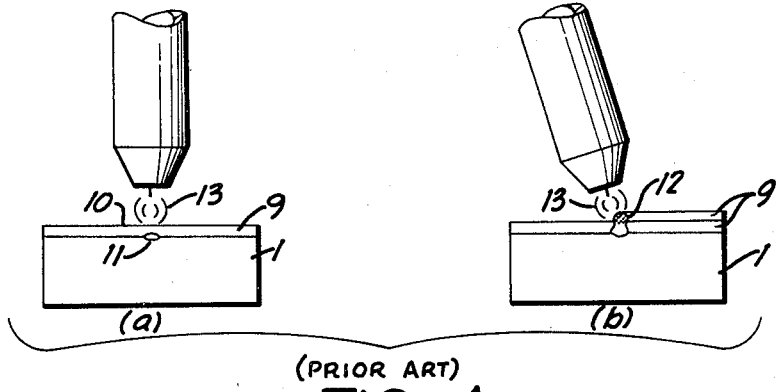

From the foregoing description, it will be understood that a sound weld can be obtained in practicing the Ta fillet welding of the Ta clad steel of FIG. 6, using the clad steel of FIG. 5, because below the Ta layer is provided the intermediate layer of such a material as Ti, Nb, Mo, Zr or an alloy thereof, which has a high melting point and will not become brittle when fused together with Ta. Namely, if the intermediate layer is not present, the Ta layer and the carbon steel base will be melted at their boundary, as shown in FIG. 4, and the iron in the carbon steel base will migrate into the weld, rendering the same brittle. However, with the intermediate layer provided below the Ta layer, as described above, the heat of an arc during the fillet welding of the Ta layers is entirely absorbed by the intermediate layer, so that the carbon steel base and the intermediate layer are not melted at their boundary and hence the migration of iron into the weld does not occur. Thus, a sound weld can be obtained. Furthermore, by employing the method described above, the thickness of the Ta layer can be reduced to the possible extent, which is a great contribution to the reduction of cost.

Figure 7:
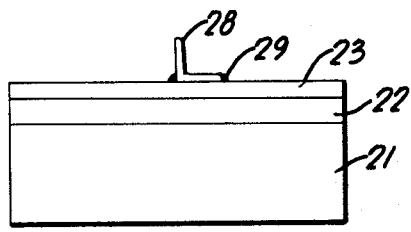
FIG. 7 is a diagram illustrating the welding of an internal element using the clad steel of this invention.

The use of the clad steel according to the present invention in the welding of an interior element will now be described with reference to FIG. 7. In FIG. 7, reference numeral 28 designates an internal element to be connected to the Ta layer 23, which is made of Ta, and 29 designates the resultant weld. In this case, a sound weld can also be obtained, owing to the presence of the intermediate layer 22 below the Ta layer 22. If the intermediate layer 22 is not present, the Ta layer and the carbon steel base will be melted at their boundary, as shown in FIG. 4, and the iron in said carbon steel base will migrate into the weld, rendering the same brittle. However, with the intermediate layer 22 present below the Ta layer 23 as in this embodiment, the heat of an arc, applied to the welding portion, is completely absorbed by the intermediate layer during the welding operation. Therefore, the carbon steel base 21 and the intermediate layer 22 are not melted at their boundary and hence a sound weld can be obtained.

Figure 8:
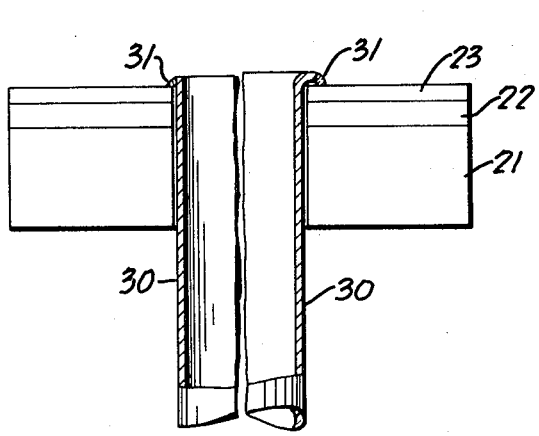
FIG. 8 is a diagram illustrating the welding of a nozzle or a tube with a tube plate, using the clad sheet of the invention.

FIG. 8 illustrates the welding of a nozzle or a tube to a tube plate, using the clad steel according to the invention. In FIG. 8, reference numeral 30 designates the tube or nozzle, made of Ta, and 31 designates a weld formed by the fillet welding of the tube or nozzle to the tube plate. In this case, the tube or nozzle 30 is inserted into the clad steel and welded thereto by the fillet welding to form the weld 31. The weld is sound due to the same functional effect as that described with reference to FIG. 7.

Now, the present invention will be further illustrated hereunder by way of example thereof:

EXAMPLE

A bridge member made of Ta and having a thickness of 1 mm. was placed on and welded to a Ta clad steel by fillet welding according to the TIG method, which clad steel was composed of a carbon steel base having a thickness of 20 mm., a Ti sheet having a thickness of 4 mm. and laminated on top of said carbon steel base by explosive cladding, and a Ta sheet having a thickness of 1 mm. and further laminated on top of said Ti sheet by explosive cladding. As shown in Photographs 1 and 2, no fusion of the Ti layer and the carbon steel base at their boundary nor migration of Ti into the Ta weld was observed, and an excellent Ta weld was obtained.

Furthermore, the result of a bending test conducted on the weld was satisfactory, as shown in Photograph 3, proving that the weld was sound and free of defect.

What is claimed is:

1. A clad steel plate comprising a base layer formed of a carbon steel, an intermediate layer formed of a material selected from the group consisting of Ti, Zr, Mo, Nb and alloys thereof being cladded onto one surface of said base layer, and a surface layer formed of one of Ta and Ta alloy being cladded to the surface of said intermediate layer opposite the surface thereof cladded to said base layer, and the material of said intermediate layer having a high melting point and not being subject to embrittlement when melted together with the material of said surface layer.

2. A clad steel plate, as set forth in claim 1, wherein said base layer having a thickness of 20 mm., said intermediate layer having a thickness of 4 mm., and said surface layer having a thickness of 1 mm.

3. A clad steel plate, as set forth in claim 1, wherein a pair of said plates formed of said base, intermediate and surface layers being arranged in edge-to-edge relationship, a weld connection securing said base layers together and said weld connection being formed of a common metal with said base layers, the adjacent edges of said intermediate and surface layers of said plates being spaced apart and defining a groove spanning said weld connection of said base layers, a metal plate being fitted into and filling said groove and being formed of a metal similar to said intermediate layer, and a bridge member spanning said metal plate fitted into said groove and being fillet welded to each of said surface layers on the opposite sides of said groove, said bridge member being formed of the same material as said surface layer.

* * * * *